US012587471B2

(12) United States Patent
Sivaswamy et al.

(10) Patent No.: US 12,587,471 B2
(45) Date of Patent: Mar. 24, 2026

(54) DYNAMIC AUTHORIZATION BASED ON EXECUTION PATH STATUS

(71) Applicant: INTERNATIONAL BUSINESS MACHINES CORPORATION, Armonk, NY (US)

(72) Inventors: Hemant Kumar Sivaswamy, Pune (IN); Anuj Chandra, Pune (IN); Nadiya Kochura, Bolton, MA (US); Tiberiu Suto, Franklin, NY (US)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 18/055,285

(22) Filed: Nov. 14, 2022

(65) Prior Publication Data

US 2024/0163206 A1 May 16, 2024

(51) Int. Cl.
| | |
|---|---|
| *H04L 45/42* | (2022.01) |
| *H04L 45/12* | (2022.01) |
| *H04L 45/24* | (2022.01) |

(52) U.S. Cl.
CPC ............ *H04L 45/42* (2013.01); *H04L 45/123* (2013.01); *H04L 45/24* (2013.01)

(58) Field of Classification Search
CPC ........ H04L 45/24; H04L 45/42; H04L 45/123
See application file for complete search history.

(56) References Cited

U.S. PATENT DOCUMENTS

| | | | | |
|---|---|---|---|---|
| 8,341,612 | B2 * | 12/2012 | He | G06F 9/30 |
| | | | | 716/113 |
| 8,370,956 | B2 | 2/2013 | Stefik | |
| 9,092,385 | B2 | 7/2015 | Resch | |
| 11,321,084 | B1 * | 5/2022 | Trim | G06N 7/01 |
| 2008/0282318 | A1 * | 11/2008 | Rits | G06Q 10/06 |
| | | | | 718/103 |
| 2012/0017189 | A1 * | 1/2012 | Durbha | G06F 30/337 |
| | | | | 716/113 |
| 2012/0066166 | A1 * | 3/2012 | Curbera | G06N 7/01 |
| | | | | 706/52 |

(Continued)

FOREIGN PATENT DOCUMENTS

| | | |
|---|---|---|
| CN | 109936630 B | 9/2021 |
| EP | 2724516 B1 | 11/2017 |

OTHER PUBLICATIONS

Mehran Ahsant; On-demand Restricted Delegation; A Framework for Dynamic, Context-Aware, Least-Privilege Delegation in Grids; Doctoral Thesis Stockholm, Sweden 2009; pp. 1-159.*

(Continued)

*Primary Examiner* — Mohammad A Siddiqi
(74) *Attorney, Agent, or Firm* — Aaron N. Pontikos

(57) ABSTRACT

A method is provided for dynamic authorization based on execution path status. The method includes identifying a plurality of execution paths in prior authorization data, in which each execution path contains a plurality of nodes. The identified plurality of execution paths are ranked according to probability. At least part of a most probable execution path from among the ranked plurality of execution paths is determined for a current user based on a current node. Node access authorizations are automatically generated based on the at least part of the determined most probable execution path.

20 Claims, 3 Drawing Sheets

(56) References Cited

U.S. PATENT DOCUMENTS

| | | | | |
|---|---|---|---|---|
| 2015/0242626 | A1* | 8/2015 | Wang | G06F 21/577 |
| | | | | 726/23 |
| 2017/0161104 | A1* | 6/2017 | Johnson | G06Q 10/063 |
| 2017/0220281 | A1 | 8/2017 | Gupta | |
| 2018/0012020 | A1* | 1/2018 | Prvulovic | G06F 21/552 |
| 2018/0139056 | A1 | 5/2018 | Satoshi | |
| 2020/0127841 | A1* | 4/2020 | Litsios | G06Q 20/0658 |
| 2021/0097024 | A1 | 4/2021 | Miller | |
| 2021/0249002 | A1* | 8/2021 | Ahmadidaneshashtiani | |
| | | | | H04L 51/02 |
| 2022/0159010 | A1 | 5/2022 | Bandarupalli | |
| 2022/0360544 | A1* | 11/2022 | Mingels | G06F 16/3329 |
| 2024/0104307 | A1* | 3/2024 | Akbulut | H04L 51/02 |

OTHER PUBLICATIONS

Enforcement of Timing-Sensitive Security Policies in Runtime Systems by Mathias Vorreiter Pedersen; Department of Computer Science Aarhus University, Denmark; Jul. 31, 2019; pp. 1-216.*
Static Detection of Collusion Attacks in ARBAC-Based Workflow Systems; S Calzavara, A Rabitti, E Steffinlongo—2016 IEEE 29th , 2016—academia.edu; pp. 1-13.*
Avijit et al., "Distributed Programming with Distributed Authorization", TLDI'10, Jan. 23, 2010, ACM 2010, pp. 1-12.
Hinrichs, "Centralized vs. Distributed Authorization: the CAP theorem", https://www.styra.com/blog/centralized-vs.-distributed-authorization-th . . . , May 8, 2019, pp. 1-6.
Simon M., "Next Generation Distributed Authorization", http: //securityboulevard.com/209/07 next-generation-distributed-authorization/, B Security Boulevard, Jul. 4, 2019,.

* cited by examiner

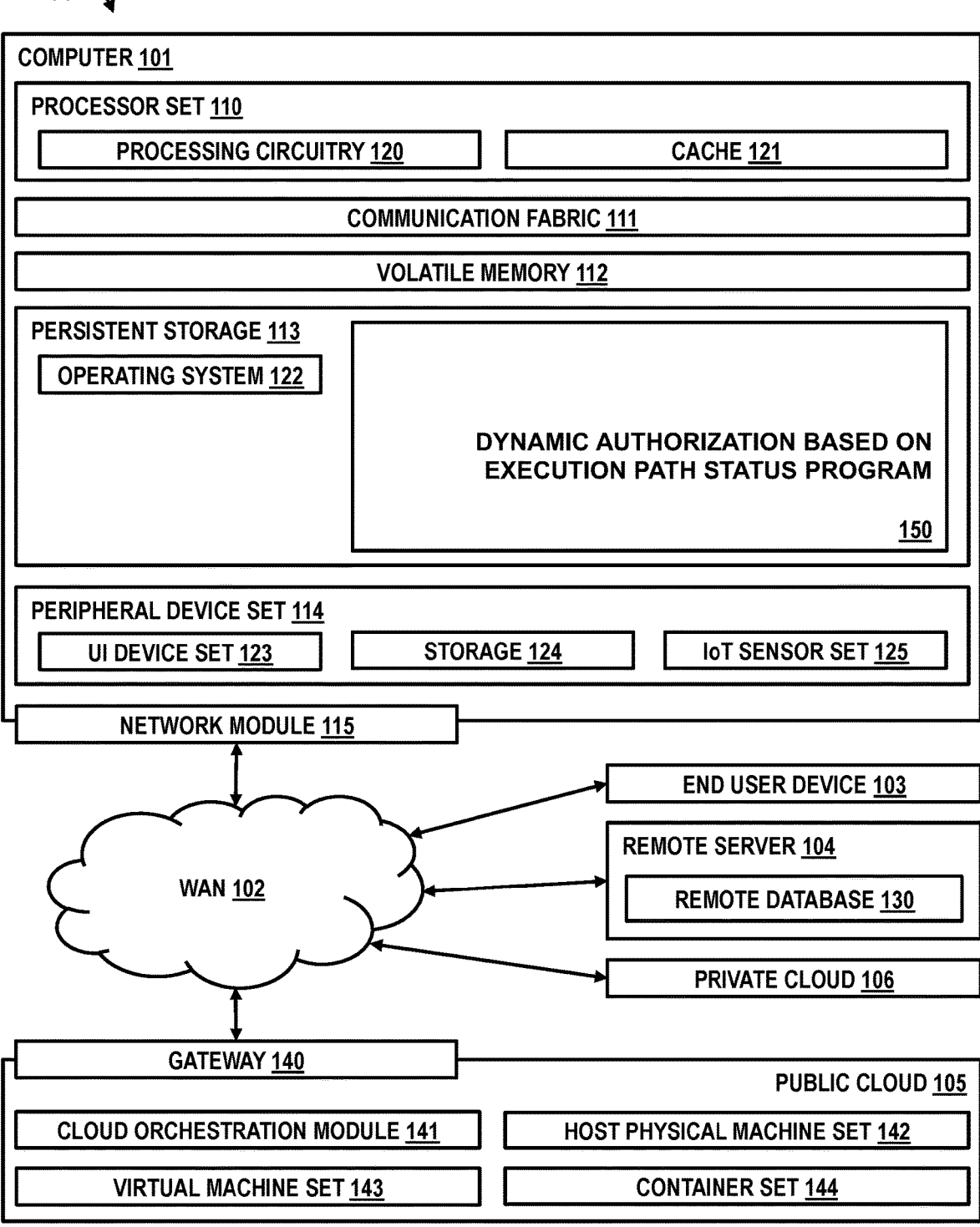

100

COMPUTER 101

PROCESSOR SET 110

PROCESSING CIRCUITRY 120    CACHE 121

COMMUNICATION FABRIC 111

VOLATILE MEMORY 112

PERSISTENT STORAGE 113

OPERATING SYSTEM 122

DYNAMIC AUTHORIZATION BASED ON EXECUTION PATH STATUS PROGRAM

150

PERIPHERAL DEVICE SET 114

UI DEVICE SET 123    STORAGE 124    IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141    HOST PHYSICAL MACHINE SET 142

VIRTUAL MACHINE SET 143    CONTAINER SET 144

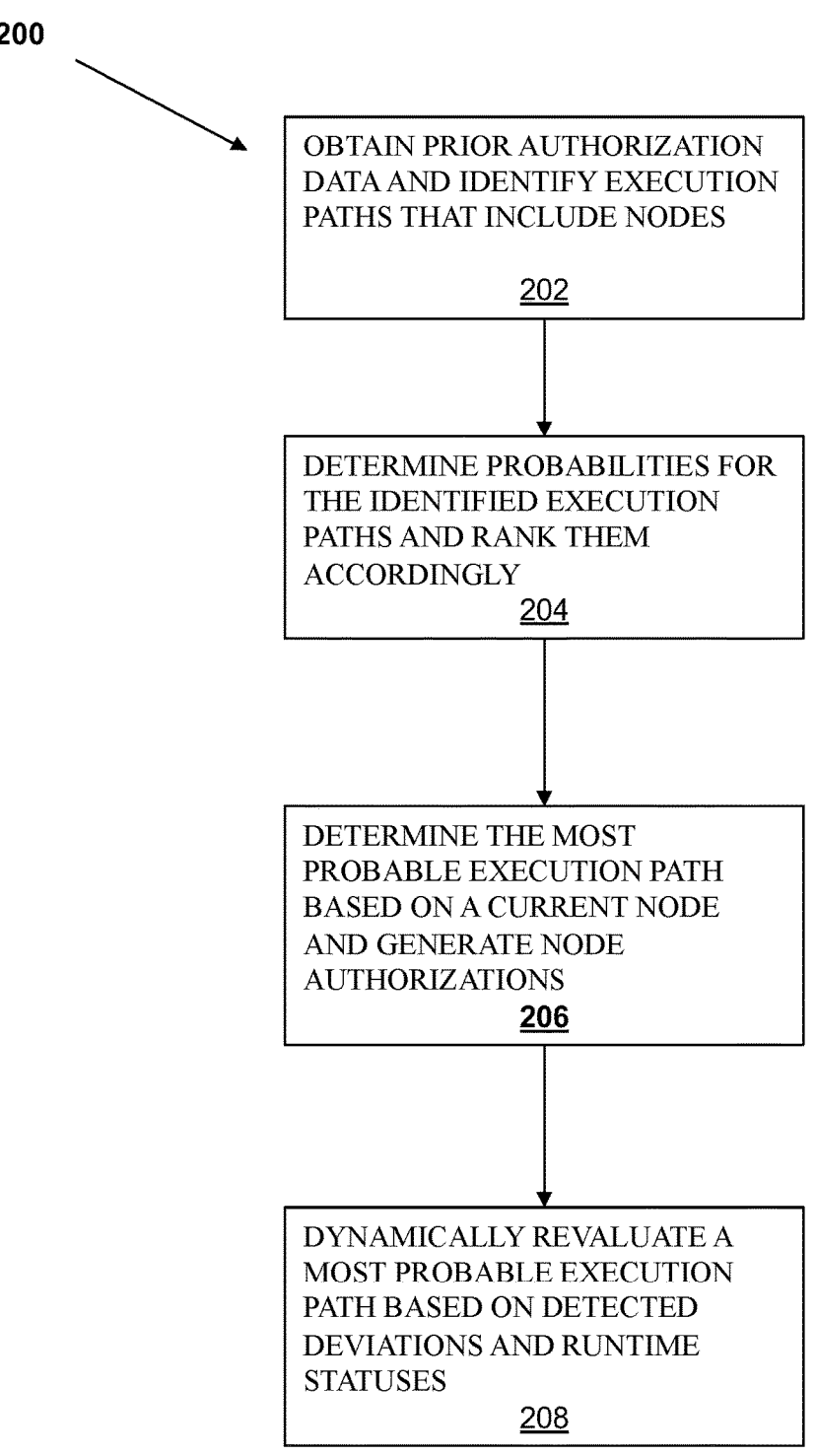

OBTAIN PRIOR AUTHORIZATION
DATA AND IDENTIFY EXECUTION
PATHS THAT INCLUDE NODES

202

DETERMINE PROBABILITIES FOR
THE IDENTIFIED EXECUTION
PATHS AND RANK THEM
ACCORDINGLY
204

DETERMINE THE MOST
PROBABLE EXECUTION PATH
BASED ON A CURRENT NODE
AND GENERATE NODE
AUTHORIZATIONS
206

DYNAMICALLY REVALUATE A
MOST PROBABLE EXECUTION
PATH BASED ON DETECTED
DEVIATIONS AND RUNTIME
STATUSES
208

*FIG. 2A*

First time customer

DYNAMIC AUTHORIZATION BASED ON EXECUTION PATH STATUS

BACKGROUND

Exemplary embodiments of the present inventive concept relate to dynamic authorization, and more particularly, to dynamic authorization based on execution path status.

There are two major ways to implement user authorization of resources (e.g., objects, services, containers, etc.): centralized and decentralized authorization systems. In a centralized authorization system, a dedicated service (e.g., microservice) makes all the authorization decisions. Other services make a network authorization request to the dedicated service and await an authorization decision. In a distributed authorization system, a sidecar service is run adjacent to each service that requires authorization. The authorization decision requests are thus fulfilled locally. The distributed authorization system requires constant synchronization of the sidecar services with the centralized authorization service. In both centralized and decentralized authorization systems—authorization access roles are defined per service. However, in some distributed authorization systems, the execution path status is built dynamically, and the next service to call is decided based on the runtime status of the current service. This is inefficient and involves potential latency and connectivity issues which delay or prevent authorization of access to resources. In this case, the access control to various services depends on the state of the current service. For example, if service A fails (exit code NOK), then the access to the service B ("B Path") needs to be revoked, but access to service C ("C Path") granted.

SUMMARY

Exemplary embodiments of the present inventive concept relate to a method, a computer program product, and a system for dynamic authorization based on execution path status.

According to an exemplary embodiment of the present inventive concept, a method is provided for dynamic authorization based on execution path status. The method includes identifying a plurality of execution paths in prior authorization data, in which each execution path contains a plurality of nodes. The identified plurality of execution paths are ranked according to probability. At least part of a most probable execution path from among the ranked plurality of execution paths is determined for a current user based on a current node. Node access authorizations are automatically generated based on the at least part of the determined most probable execution path.

According to an exemplary embodiment of the present inventive concept, a computer program product is provided for dynamic authorization based on execution path status. The computer program product includes one or more computer-readable storage media and program instructions stored on the one or more non-transitory computer-readable storage media capable of performing a method. The method is provided for dynamic authorization based on execution path status. The method includes identifying a plurality of execution paths in prior authorization data, in which each execution path contains a plurality of nodes. The identified plurality of execution paths are ranked according to probability. At least part of a most probable execution path from among the ranked plurality of execution paths is determined for a current user based on a current node. Node access authorizations are automatically generated based on the at least part of the determined most probable execution path.

According to an exemplary embodiment of the present inventive concept, a computer system is provided for dynamic authorization based on execution path status. The system includes one or more computer processors, one or more computer-readable storage media, and program instructions stored on the one or more of the computer-readable storage media for execution by at least one of the one or more processors capable of performing a method. The method is provided for dynamic authorization based on execution path status. The method includes identifying a plurality of execution paths in prior authorization data, in which each execution path contains a plurality of nodes. The identified plurality of execution paths are ranked according to probability. At least part of a most probable execution path from among the ranked plurality of execution paths is determined for a current user based on a current node. Node access authorizations are automatically generated based on the at least part of the determined most probable execution path.

BRIEF DESCRIPTION OF THE DRAWINGS

The following detailed description, given by way of example and not intended to limit the exemplary embodiments solely thereto, will best be appreciated in conjunction with the accompanying drawings, in which:

FIG. 1 illustrates a schematic diagram of computing environment 100, which may include dynamic authorization based on execution path status program 150, in accordance with an exemplary embodiment of the present inventive concept.

FIG. 2A illustrates a flowchart of dynamic authorization based on execution path status 200, in accordance with an exemplary embodiment of the present inventive concept.

Figure 2B:
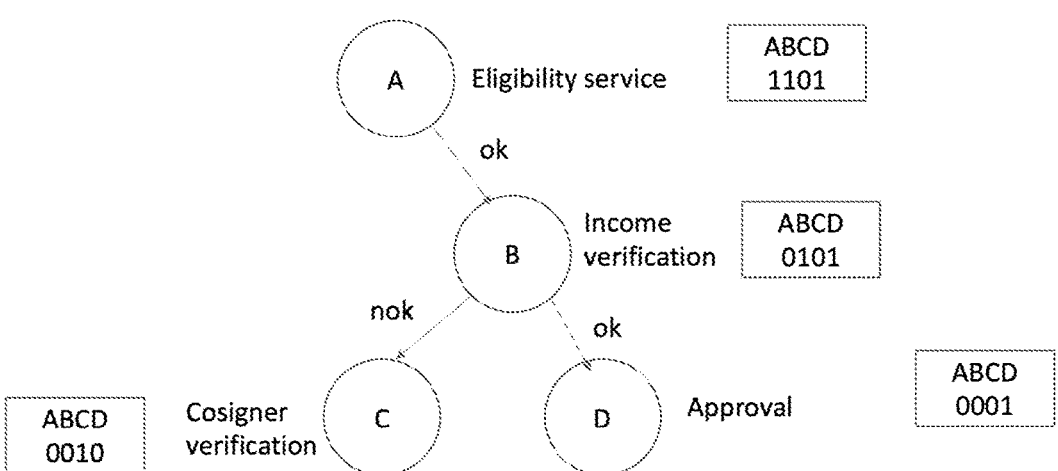
FIG. 2B illustrates a block diagram example of the dynamic authorization based on execution path status 200, according to an exemplary embodiment of the present invention.

It is to be understood that the included drawings are not necessarily drawn to scale/proportion. The included drawings are merely schematic examples to assist in understanding of the present inventive concept and are not intended to portray fixed parameters. In the drawings, like numbering may represent like elements.

DETAILED DESCRIPTION

Exemplary embodiments of the present inventive concept are disclosed hereafter. However, it shall be understood that the scope of the present inventive concept is dictated by the claims. The disclosed exemplary embodiments are merely illustrative of the claimed system, method, and computer program product. The present inventive concept may be embodied in many different forms and should not be construed as limited to only the exemplary embodiments set forth herein. Rather, these included exemplary embodiments are provided for completeness of disclosure and to facilitate an understanding to those skilled in the art. In the detailed description, discussion of well-known features and techniques may be omitted to avoid unnecessarily obscuring the presented exemplary embodiments.

References in the specification to "one embodiment," "an embodiment," "an exemplary embodiment," etc., indicate that the embodiment described may include a particular feature, structure, or characteristic, but not every embodiment may necessarily include that feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether explicitly described.

In the interest of not obscuring the presentation of the exemplary embodiments of the present inventive concept, in the following detailed description, some processing steps or operations that are known in the art may have been combined for presentation and for illustration purposes, and in some instances, may have not been described in detail. Additionally, some processing steps or operations that are known in the art may not be described at all. The following detailed description is focused on the distinctive features or elements of the present inventive concept according to various exemplary embodiments.

There is a need to provide dynamic authorization/access control to distributed objects or services within a session based on the state of the current service or object. The inventive concept provided herein permits dynamic access control to distributed objects and/or services based on the execution path and current service execution state. Thus, user access to various objects and/or services is controlled dynamically. The present inventive concept mitigates the risk of non-authorized and non-intended access to the services and reduces the time and resources needed to synchronize the access control updates. In addition, time intervals may be assigned for granted access control duration based on the runtime system characteristics.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as dynamic authorization based on execution path status program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2A illustrates a flowchart of dynamic authorization based on execution path status 200, in accordance with an exemplary embodiment of the present inventive concept.

The dynamic authorization based on execution path status program 150 may obtain prior authorization data and identify execution paths that include nodes (step 202). The nodes as referred to herein may refer to remote objects, containers, and/or services. The obtained prior authorization data may include various sources of user access/authorization (e.g., user roles, access/authorization permissions and/or criteria, runtime logs, system snapshot logs, miscellaneous access/authorization documentation, customer support logs, etc.) that include at least one execution path. The at least one execution path may include a plurality of nodes, entry/exit codes, a duration of access for each node, and/or a node access sequence (e.g., access control string). The at least one execution path may include nodes related to at least one execution path theme (e.g., a digital loan application). Individual nodes may be related to sub-themes (e.g., co-signer verification for the digital loan application). In an embodiment, the dynamic authorization based on execution path status program 150 may identify the at least one execution path theme and/or node sub-themes by applying machine learning processes (e.g., pattern recognition, natural language processing (NLP), etc.) to the obtained prior authorization data and/or multimedia (e.g., text, video, audio, animations, etc.) on websites from which the nodes are accessed. The at least one identified execution path theme may also be based on the inclusion of at least one node, order thereof in the execution path (e.g., the first node accessed by the user), and/or the user role, etc. The dynamic authorization based on execution path status program 150 may generate identified execution path graphs (e.g., overlay and/or unidirectional, etc.). Binary access may define access authorization, however, the present inventive concept is not limited thereto. For example, binary access may be expanded to the octave so to provide more granular access authorization matching (R/W/U).

For example, with reference to FIG. 2B, the dynamic authorization based on execution path status program 150 obtains prior authorization data for bank loan applicants and identifies execution paths related to the theme of bank loan applications, which include nodes A, B, C, and D, which have respective sub-themes of eligibility service, income verification, co-signer verification, and approval. The identified execution paths in the obtained bank loan applicant prior authorization data are ABC and ABD. The possible execution paths are represented as ABC: {1,1,1,0}, ABD: {1,1,0,1} where 1=access and 0=access denied to respective nodes. The dynamic authorization based on execution path status program 150 generates a unidirectional graph with nodes A, B, C, and D.

The dynamic authorization based on execution path status program 150 may determine probabilities for the identified execution paths and rank them accordingly (step 204). The dynamic authorization based on execution path status program 150 may determine a frequency and probability for each execution path and/or segments thereof contained in the obtained prior authorization data. The probabilities for the identified execution paths may be ranked on various bases, such as: overall; user role; execution path theme; proceeding from a given node and/or sequence position; and/or a prior segment. The dynamic authorization based on execution path status program 150 may rank the probabilities of subsequent execution path segments from the given node according to a preceding execution path segment (e.g., constituent node(s), position(s), and/or a sequence thereof).

In an embodiment, the dynamic authorization based on execution path status program 150 may iterate over multiple logs, extract reported events and correlate events. For each type of event, the dynamic authorization based on execution path status program 150 may identify characteristics (e.g., repeatability, distribution, etc.). In an embodiment, the dynamic authorization based on execution path status program 150 may assign the access to the nodes based on the probability of calling that node within a pipeline or workflow. The probability of access to a node in an execution path may be represented by the number of calls to the node divided by the number of sessions plus lambda.

For example, with reference to FIG. 2B, in 80% of cases the execution path of bank loan applicants is ABD (P1). In only 20% of cases, the execution path of bank loan applicants is ABC (P2). Thus, the dynamic authorization based on execution path status program 150 ranks P1>P2.

The dynamic authorization based on execution path status program 150 may determine the most probable execution path based on a current node and generate node authorizations (step 206). The user may access or request access to a subsequent node from the current node. Based on the identity of the current node, sequence, prior execution path segment, runtime state (i.e., authorization status), and/or the user role, the dynamic authorization based on execution path status program 150 may employ pattern matching and populate, call, and/or grant access to the subsequent node (e.g., second node) in a determined most-probable execution path and/or segment. In an embodiment, the dynamic authorization based on execution path status program 150 may populate and/or call the first node upon a user login, such as according to a user profile, the identified theme, and/or the user role. The dynamic authorization based on execution path status program 150 may populate, call, and/or grant access to each node (e.g., subsequent nodes) in the determine most-probable execution path and/or segment simultaneously or automatically in sequence. The access duration for each of the nodes is based on the relevant access durations identified in the prior authorization data. However, the present inventive concept is not limited thereto. The dynamic authorization based on execution path status program 150 may also modify the identified access duration for various reasons (e.g., insufficient access duration based on repeated calls to a same node, etc.). At runtime, the dynamic authorization based on execution path status program 150 may evaluate the nodes' performances and/or overall cluster performance and estimate an appropriate authorized duration of access. Given an identified execution path, the time of access may be represented by a maximum time of response time multiplied by the number of sessions plus delta. A most probable execution path graph may be generated.

For example, with reference to FIG. 2B, when a bank loan applicant logs in, the dynamic authorization based on execution path status program 150 automatically generated the most probable execution path graph and grants the user access to node A with assigned access control 1101 in which access to A=1, access to B=1, access to C=0, and access to D=1 based on the ranked most probable execution path.

The dynamic authorization based on execution path status program 150 may dynamically revaluate a most probable execution path based on detected deviations and runtime statuses (step 208). At runtime, the dynamic authorization based on execution path status program 150 may evaluate the node status, such as a current node exit code, subsequent node entry code, calling node status, and adjust the populated nodes, authorized accesses, access durations, and scheduled calls accordingly. If an entry code to the subsequent node or an exit code from the current node to the subsequent node in the most probable execution path and/or segment fails, the dynamic authorization based on execution path status program 150 may revaluate the most probable execution path from the most recently accessed node (e.g., the current node). If the user successfully accesses a subsequent node that deviates from the most probable execution path and/or segment, the dynamic authorization based on execution path status program 150 may revaluate the most probable execution path and/or segment accordingly. The dynamic authorization based on execution path status program 150 may revoke previously authorized accesses. In addition, the dynamic authorization based on execution path status program 150 may revise execution path graphs and/or ranks when a threshold of occurrence is reached for another identified execution path and/or a new execution path.

The dynamic authorization based on execution path status program 150 evaluates the exit code for node A. If OK, the dynamic authorization based on execution path status program 150 keeps the access to service B and D, but revokes access to node A as the user cannot go backwards. When the user enters node B, the system invokes service B with access control string 0101. Based on runtime log analyses the execution path status program 150 detects that now 90% of the time the service B has failed with NOK code. The execution path status program 150 revaluates the original assignment to the user access control when entering Node A: from 1101 to 1110. That still does not prevent the flow going through the 10% of possible paths, but it reduces the risk of non-authorized access and reduces time of synchronizing the access control updates across possible execution paths (in both centralized and decentralized schemes).

Based on the foregoing, a computer system, method, and computer program product have been disclosed. However, numerous modifications, additions, and substitutions can be made without deviating from the scope of the exemplary embodiments of the present inventive concept. Therefore, the exemplary embodiments of the present inventive concept have been disclosed by way of example and not by limitation.

The invention claimed is:

1. A method for dynamic authorization based on execution path status is provided, the method comprising:
   identifying a plurality of execution paths in prior authorization data, wherein each execution path contains a plurality of nodes;
   ranking the identified plurality of execution paths according to probability;
   determining at least part of a most probable execution path from among the ranked plurality of execution paths for a current user based on a current node; and
   generating node access authorizations automatically based on the at least part of the determined most probable execution path.

2. The method of claim 1, further comprising:
   obtaining the prior authorization data, wherein the prior authorization data includes at least one of runtime logs, system snapshot logs, documentation, and customer supports logs.

3. The method of claim 2, further comprising:
   revaluating at least part of a new most probable execution path based on detected node access deviations or runtime statuses.

4. The method of claim 3, further comprising:

revoking the generated node access authorizations for the at least part of the determined most probable execution path; and generating node access authorizations for the at least part of the revaluated new most probable execution path.

5. The method of claim 4, wherein the at least part of the most probable execution path and the at least part of the revaluated most probable execution path are unidirectional.

6. The method of claim 5, wherein the revoked node access authorizations include prior accessed nodes, and wherein the generated node access authorizations for the at least part of the revaluated new most probable execution path correspond to nodes in a subsequent segment.

7. The method of claim 6, further comprising:

reordering the ranked plurality of execution paths by probability when a relative threshold of occurrence is reached for at least one execution path.

8. A computer program product for dynamic authorization based on execution path status, the computer program product comprising:

one or more computer-readable storage media and program instructions stored on the one or more non-transitory computer-readable storage media capable of performing a method, the method comprising:

identifying a plurality of execution paths in prior authorization data, wherein each execution path contains a plurality of nodes;

ranking the identified plurality of execution paths according to probability;

determining at least part of a most probable execution path from among the ranked plurality of execution paths for a current user based on a current node; and generating node access authorizations automatically based on the at least part of the determined most probable execution path.

9. The method of claim 8, further comprising:

obtaining the prior authorization data, wherein the prior authorization data includes at least one of runtime logs, system snapshot logs, documentation, and customer supports logs.

10. The method of claim 9, further comprising:

revaluating at least part of a new most probable execution path based on detected node access deviations or runtime statuses.

11. The method of claim 10, further comprising:

revoking the generated node access authorizations for the at least part of the determined most probable execution path; and generating node access authorizations for the at least part of the revaluated new most probable execution path.

12. The method of claim 11, wherein the at least part of the most probable execution path and the at least part of the revaluated most probable execution path are unidirectional.

13. The method of claim 12, wherein the revoked node access authorizations include prior accessed nodes, and wherein the generated node access authorizations for the at least part of the revaluated new most probable execution path correspond to nodes in a subsequent segment.

14. The method of claim 13, further comprising:

reordering the ranked plurality of execution paths by probability when a relative threshold of occurrence is reached for at least one execution path.

15. A computer system for dynamic authorization based on execution path status, the system comprising:

one or more computer processors, one or more computer-readable storage media, and program instructions stored on the one or more of the computer-readable storage media for execution by at least one of the one or more processors capable of performing a method, the method comprising:

identifying a plurality of execution paths in prior authorization data, wherein each execution path contains a plurality of nodes;

ranking the identified plurality of execution paths according to probability;

determining at least part of a most probable execution path from among the ranked plurality of execution paths for a current user based on a current node; and generating node access authorizations automatically based on the at least part of the determined most probable execution path.

16. The method of claim 15, further comprising:

obtaining the prior authorization data, wherein the prior authorization data includes at least one of runtime logs, system snapshot logs, documentation, and customer supports logs.

17. The method of claim 16, further comprising:

revaluating at least part of a new most probable execution path based on detected node access deviations or runtime statuses.

18. The method of claim 17, further comprising:

revoking the generated node access authorizations for the at least part of the determined most probable execution path; and generating node access authorizations for the at least part of the revaluated new most probable execution path.

19. The method of claim 18, wherein the at least part of the most probable execution path and the at least part of the revaluated most probable execution path are unidirectional.

20. The method of claim 19, wherein the revoked node access authorizations include prior accessed nodes, and wherein the generated node access authorizations for the at least part of the revaluated new most probable execution path correspond to nodes in a subsequent segment.

* * * * *